UNITED STATES PATENT OFFICE.

CHARLES RICHTER, OF ST. PAUL, MINNESOTA.

LIGHT-LEATHER-COLORING COMPOUND.

SPECIFICATION forming part of Letters Patent No. 260,416, dated July 4, 1882.

Application filed March 8, 1882. (No specimens.)

*To all whom it may concern:*

Be it known that I, CHARLES RICHTER, of the city of St. Paul, in the county of Ramsey and State of Minnesota, have invented a new and useful composition of matter called by me "Light-Leather-Coloring Compound," of which the following is a full, clear, and exact description of the manner of making and compounding, and of the ingredients composing the same, to wit:

Add in the proportion of twenty-five gallons of pure water two pounds of sulphate of iron and one pound of bichromate of potash, and thoroughly dissolve and mingle the same, and then add in the proportion of twenty-five gallons of said compound one quart of hot water in which has first been dissolved one ounce of terra-japonica and one ounce of hemlock extract, more or less, as the compound is intended to produce a lighter or darker color upon hides after tawing and other dressing.

I disclaim the composition patented to Wm. A. Bonney in patent dated November 30, 1875, No. 170,513.

The use of the hereinbefore-described mixture as part of an entire process for tawing and coloring hides is covered by another patent of even date with this, this patent being limited to the composition described and claimed.

Having now stated the manner of making my new compound and the ingredients composing the same, I claim as my invention—

A coloring compound composed of water, sulphate of iron, bichromate of potash, terra-japonica, and hemlock extract, mingled in the proportions and manner substantially as set forth.

CHARLES RICHTER.

In presence of—
ALVA L. ROE,
ANGIER AMES.